United States Patent
Onda et al.

(10) Patent No.: US 10,060,492 B2
(45) Date of Patent: Aug. 28, 2018

(54) FRICTION MATERIAL (71) Applicant: AKEBONO BRAKE INDUSTRY CO., LTD., Tokyo (JP)

(72) Inventors: Yoichi Onda, Tokyo (JP); Hiroshi Yamamoto, Tokyo (JP); Satoshi Kusaka, Tokyo (JP); Yoshiyuki Sugai, Tokyo (JP); Katsuji Seki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 78 days.

(21) Appl. No.: 14/653,429

(22) PCT Filed: Dec. 20, 2013

(86) PCT No.: PCT/JP2013/084242
§ 371 (c)(1),
(2) Date: Jun. 18, 2015

(87) PCT Pub. No.: WO2014/098215
PCT Pub. Date: Jun. 26, 2014

(65) Prior Publication Data
US 2015/0369320 A1    Dec. 24, 2015

(30) Foreign Application Priority Data

Dec. 21, 2012 (JP) .................. 2012-280238
Feb. 28, 2013 (JP) .................. 2013-040022

(51) Int. Cl.
| | |
|---|---|
| F16D 69/02 | (2006.01) |
| C08L 61/06 | (2006.01) |
| C08L 87/00 | (2006.01) |
| C08L 61/14 | (2006.01) |
| C08K 3/04 | (2006.01) |
| C08K 3/16 | (2006.01) |
| C08K 3/30 | (2006.01) |
| C08K 3/34 | (2006.01) |
| C08K 7/04 | (2006.01) |
| C08L 77/10 | (2006.01) |
| C08L 97/02 | (2006.01) |
| F16D 69/00 | (2006.01) |

(52) U.S. Cl.
CPC .............. *F16D 69/025* (2013.01); *C08K 3/04* (2013.01); *C08K 3/16* (2013.01); *C08K 3/30* (2013.01); *C08K 3/34* (2013.01); *C08K 7/04* (2013.01); *C08L 61/06* (2013.01); *C08L 61/14* (2013.01); *C08L 77/10* (2013.01); *C08L 87/005* (2013.01); *C08L 97/02* (2013.01); *F16D 69/026* (2013.01); *C08L 2205/16* (2013.01); *F16D 2069/002* (2013.01); *F16D 2200/0065* (2013.01); *F16D 2200/0086* (2013.01)

(58) Field of Classification Search
CPC ................. C08L 61/06; C08L 87/005
USPC ...................................................... 523/156
See application file for complete search history.

(56) References Cited

U.S. PATENT DOCUMENTS

| | | | |
|---|---|---|---|
| 5,670,231 A * | 9/1997 | Ohya .................... | C08G 59/08 428/297.4 |
| 5,962,551 A | 10/1999 | Kobayashi et al. | |
| 7,078,009 B2 | 7/2006 | Ogawa et al. | |
| 7,297,728 B2 | 11/2007 | Yamamoto et al. | |
| 8,522,932 B2 | 9/2013 | Hattori et al. | |
| 2004/0253173 A1 | 12/2004 | Ogawa et al. | |
| 2005/0004258 A1 | 1/2005 | Yamamoto et al. | |
| 2005/0014862 A1* | 1/2005 | Kusaka ................ | F16D 69/026 523/152 |
| 2007/0219289 A1* | 9/2007 | Phipps ................ | F16D 69/026 523/152 |
| 2008/0249222 A1* | 10/2008 | Itoi ..................... | C01G 23/005 524/413 |
| 2010/0084233 A1 | 4/2010 | Subramanian | |
| 2010/0112350 A1 | 5/2010 | Tanimizu et al. | |
| 2011/0158898 A1 | 6/2011 | Itoi | |
| 2011/0259686 A1 | 10/2011 | Hattori et al. | |
| 2013/0096228 A1 | 4/2013 | Yamamoto et al. | |
| 2013/0220748 A1* | 8/2013 | Unno .................. | F16D 69/026 188/251 A |
| 2013/0240310 A1* | 9/2013 | Baba .................. | F16D 69/026 188/251 A |

(Continued)

FOREIGN PATENT DOCUMENTS

| | | |
|---|---|---|
| EP | 0 816 708 A1 | 1/1998 |
| EP | 0856489 A1 | 8/1998 |
| EP | 0 816 708 B1 | 12/2001 |

(Continued)

OTHER PUBLICATIONS

Machine translation of JP 2001-107026.*

(Continued)

*Primary Examiner* — Doris L Lee
(74) *Attorney, Agent, or Firm* — Drinker Biddle & Reath LLP (57) ABSTRACT

A friction material includes a fiber base material, a friction modifier and a binder. The friction modifier includes two or more kinds of non-whisker-like titanate compounds. The non-whisker-like titanate compound includes non-whisker-like lithium potassium titanate. The friction material includes no copper component. Alternatively, a friction material includes a fiber base material, a friction modifier and a binder. The friction material includes a non-whisker-like titanate compound and a low-melting-point metal fiber. The friction material includes no copper component.

4 Claims, 1 Drawing Sheet

(56) References Cited

U.S. PATENT DOCUMENTS

2014/0202805 A1    7/2014  Unno et al.

FOREIGN PATENT DOCUMENTS

| | | |
|---|---|---|
| EP | 1440940 A1 | 7/2004 |
| EP | 2381123 A1 | 10/2011 |
| JP | A-S59-064687 | 4/1984 |
| JP | H04-304284 A | 10/1992 |
| JP | H10-17855 A | 1/1998 |
| JP | 2000-265158 A | 9/2000 |
| JP | 2001-107026 * | 4/2001 |
| JP | A-2001-107026 | 4/2001 |
| JP | 2004-155843 A | 6/2004 |
| JP | 2005-024005 A | 1/2005 |
| JP | 2005-036157 A | 2/2005 |
| JP | 2007-113642 A | 5/2007 |
| JP | 2007-197533 A | 8/2007 |
| JP | 2008-280521 A | 11/2008 |
| WO | WO-2008/123558 A1 | 10/2008 |
| WO | WO-2008/126046 A1 | 10/2008 |
| WO | WO-2011-049575 A1 | 4/2011 |
| WO | WO 2011/158917 | 12/2011 |
| WO | WO 2012/066965 * | 5/2012 |
| WO | WO-2012/066965 A1 | 5/2012 |
| WO | WO-2012/066968 A1 | 5/2012 |
| WO | WO 2012/066969 * | 5/2012 |
| WO | WO-2012/066969 A1 | 5/2012 |
| WO | WO 2012/169545 A1 | 12/2012 |
| WO | WO-2012/169546 A1 | 12/2012 |

OTHER PUBLICATIONS

Proceedings of the 25th Annual Brake Colloquium & Exhibition, Oct. 7-10, 2007, Published by SAE International, p. 99-103.

CN Office Action dated Jun. 3, 2016 from corresponding Chinese patent application no. 201380066665.6 (with attached English-language translation).

Japanese Office Action (with attached English-language translation) dated Oct. 25, 2016 that issued in Japanese patent application No. 2013-040022.

Partial Research of Corresponding EP Application dated Nov. 22, 2016.

3rd Party Observations dated Jan. 13, 2017.

Kamifuku et al., "The Brake Abrasion Properties in Two Kinds of Platelet Titanate Compound Formulations, and the Swift Brake Property Evaluation by Using the Thrust Test Method," SAE Technical Paper Series, vol. 1, Oct. 7, 2007, pp. 99-103.

Extended European Search Report dated Mar. 21, 2017 in European Patent Application No. 13864278.0.

* cited by examiner

FRICTION MATERIAL

TECHNICAL FIELD

The present invention relates to a friction material for brakes to be used for automobiles, railway vehicles, industrial machines and the like.

BACKGROUND ART

A friction material to be used for brakes such as disc brakes and drum brakes, clutches or the like, which are used for automobiles and the like, is generally formed of materials such as a friction modifier for imparting a friction function and adjusting its friction performance, a fiber base material for exerting a reinforcing function and a binder for integrating these components to impart strength. The friction material has a role of converting kinetic energy to thermal energy by frictional engagement with its opposite material, so that excellent heat resistance, wear resistance, high friction coefficient and stability of the friction coefficient are required. Further, it is also required that the squeal is less likely to occur (squeal characteristics) and the like.

As the friction modifiers for modifying the friction characteristics of the friction material include inorganic or organic fillers, abrasives, solid lubricant and the like are exemplified. These have the respective characteristics, and it is difficult to satisfy all requirements by one kind thereof. Accordingly, two or more kinds thereof are usually used in combination.

Of the friction modifiers, alumina, silica, magnesia, zirconia, copper, aluminum, zinc or the like are utilized as the inorganic fillers (inorganic friction modifiers).

Further, in order to stabilize the friction coefficient of the friction material or to improve wear resistance thereof, a friction material in which a metal is blended has been studied. Patent Document 1 discloses a friction material obtained by forming and curing a friction material composition containing a fiber base material, friction modifier and a binder, in which a bronze powder is contained as the friction modifier. Patent Document 2 discloses a friction material containing $Fe_2O_3$ and at least either one of non-whisker-like alkali metal titanates and non-whisker-like alkaline-earth metal titanates.

However, both of the friction materials described in Patent Documents 1 and 2 contain a copper component such as the bronze powder or copper fiber, and when such a friction material is used, copper is contained in a abrasion powder generated during braking, so that there is a possibility of polluting the environment.

Then, as a friction material that is low in the content of the copper component, Patent Document 3 discloses a friction material in which the content of copper is suppressed to a certain value or less and lithium potassium titanate and graphite are contained as friction modifiers.

Further, in order to improve the mechanical strength or heat resistance of the friction material, it is known that a metal fiber or metal particles are blended in the friction material. Patent Document 4 discloses a non-asbestos friction material obtained by forming and curing a friction material composition mainly containing a fiber base material containing steel fiber, a binder and a filler, in which petroleum coke having an average particle size of 50 to 150 μm and hard inorganic particles having an average particle size of 5 to 30 μm are contained. Patent Document 5 discloses a friction material containing a high-melting-point metal powder, a low-melting-point metal powder having a melting point of 420° C. or less, which is lower than that of the high-melting-point metal powder, and a metal sulfide powder.

Furthermore, in recent years, it has been suggested that the friction material containing a copper component such as copper or a copper alloy has a possibility of polluting the environment, because copper is contained in the abrasion powder generated during barking. Accordingly, a friction material containing no copper component has been demanded, in order to exert no adverse effect on the environment while maintaining high performance as the friction material.

As a friction material that is low in the content of the copper component, Patent Document 6 discloses a friction material in which the content of copper and the content of metals other than copper and copper alloy are suppressed to a certain value or less, and a specific amount of an acrylic elastomer-dispersed phenol resin as a binder and a specific amount of $Ca(OH)_2$ and/or CaO as an inorganic filler are contained as essential components.

PRIOR ART DOCUMENTS

Patent Documents

Patent Document 1: JP-A-2005-024005
Patent Document 2: JP-A-2007-197533
Patent Document 3: WO 2012/066968
Patent Document 4: JP-A-2004-155843
Patent Document 5: JP-A-4-304284
Patent Document 6: WO 2012/066965

SUMMARY OF THE INVENTION

Problems that the Invention is to Solve

However, the friction material described in Patent Document 3 has had room for improvement in terms of the effect stability, wear resistance and squeal characteristics.

Accordingly, a first object of the present invention is to provide a friction material containing no copper component and having the effect stability, wear resistance and an effect of suppressing the brake squeal.

Further, wear resistance and no occurrence of shear fracture during braking are required for a friction material. However, steel fiber is used in the friction material described in Patent Document 4, so that aggressiveness thereof on an opposite material such as a rotor is increased when used in large amounts. As a result, there is a concern that wear resistance of the friction material is deteriorated. Furthermore, in the friction material described in Patent Document 5, tin or zinc used as a low-melting-point metal is a powder, so that there is a possibility that a reinforcing effect is not sufficiently obtained. In addition, the friction material described in Patent Document 6 has had room for improvement in terms of wear resistance and shear strength.

Accordingly, a second object of the present invention is to provide a friction material reduced in environmental load and excellent in wear resistance and shear strength.

Means for Solving the Problems

The present inventors have made intensive studies in order to achieve the above-mentioned first object. As a result, it has been found that, by a friction material in which a friction modifier containing non-whisker-like lithium potassium titanate and one or more kinds of the other non-whisker-like titanate compounds is blended, the effect stability, wear resistance and effect of suppressing the brake squeal can be fulfilled, even when no copper component is contained. Thus, the present invention has been achieved.

In order to achieve the above-mentioned second object, the present inventors have made intensive studies. As a result, it has been found that by a friction material in which a non-whisker-like titanate compound and low-melting-point metal fiber are blended, wear resistance and shear strength of the friction material can be fulfilled, even when no copper component is contained. Thus, the present invention has been achieved.

That is, the present invention relates to the following (1) to (6) and (7) to (9).

(1) A friction material comprising a fiber base material, a friction modifier and a binder, wherein the friction modifier comprises two or more kinds of non-whisker-like titanate compounds, the non-whisker-like titanate compound comprises at least non-whisker-like lithium potassium titanate and the friction material comprises no copper component.

(2) The friction material according to (1), wherein the non-whisker-like titanate compound comprises potassium titanate having a shape with a plurality of convex portions.

(3) The friction material according to (1) of (2), wherein the binder comprises an elastomer-modified phenol resin.

(4) The friction material according to (3), wherein the elastomer-modified phenol resin is an acrylic rubber-modified phenol resin or a silicone rubber-modified phenol resin.

(5) The friction material according to any one of (1) to (4), comprising the non-whisker-like lithium potassium titanate in an amount of 1 to 30% by volume.

(6) The friction material according to any one of (1) to (5), comprising the non-whisker-like titanate compound in an amount of 1 to 25% by volume.

(7) A friction material comprising a fiber base material, a friction modifier and a binder, the friction material comprises a non-whisker-like titanate compound and a low-melting-point metal fiber and comprises no copper component.

(8) The friction material according to (7), wherein the low-melting-point metal fiber is a metal fiber of at least either one of aluminum and zinc.

(9) The friction material according to (7) or (8), wherein the non-whisker-like titanate compound is at least one kind selected from the group consisting of potassium titanate, lithium potassium titanate and magnesium potassium titanate.

Advantageous Effects of the Invention

The friction material according to the present invention requires no blending of a copper component that has a possibility of exerting an adverse effect on the environment, stabilizes effect, can prevent a decrease in the friction coefficient during fading, suppresses the occurrence of noise and abnormal sound because of the stabilized friction coefficient, and can reduce wear of the friction material.

In addition, the friction material according to the present invention requires no blending of a copper component that has a possibility of exerting an adverse effect on the environment, improves wear resistance of the friction material and can provide sufficient shear strength.

MODE FOR CARRYING OUT THE INVENTION

In this description, "% by mass" and "% by weight" are synonymous with each other.

<First Friction Material>

A first friction material according to the present invention will be described below.

The friction material according to the present invention includes two or more kinds of non-whisker-like titanate compounds as a friction modifier, in which one kind of the non-whisker-like titanate compounds is non-whisker-like lithium potassium titanate. Excellent effects can be exerted on the effect stability, wear resistance and squeal suppression by containing two or more kinds of non-whisker-like titanate compounds, and effect can be stabilized and squeal characteristics can be improved, by the feature that one kind of these is non-whisker-like lithium potassium titanate. It becomes possible to realize excellent effect stability, wear resistance and squeal suppression by blending two or more kinds of non-whisker-like titanate compounds in combination in the friction material, as described above.

The friction material in the present invention will be described below for each component.

The titanate compound to be used in the present invention is in a non-whisker-like shape. The non-whisker-like shape as used herein means that it is not an acicular shape (whisker-like shape) having an aspect ratio of 3 or more. Specific examples thereof include shapes such as a layer shape (scale-like shape), a columnar shape, a plate-like shape, a flake shape and a granular shape.

As the shape of non-whisker-like lithium potassium titanate to be used in the present invention (hereinafter sometimes briefly referred to as "lithium potassium titanate"), the shape such as the layer shape, the columnar shape or the plate-like shape is preferred. From the point of effect stabilization, the layer shape is preferred.

Further, as the molecular formula of lithium potassium titanate, usable examples thereof include $K_xLi_yTi_zO_w$ (wherein x=0.5 to 0.7, y=0.27, z=1.73 and w=3.85 to 3.95) or the like.

The content of lithium potassium titanate according to the present invention is preferably within the range of 1 to 30% by volume based on the whole of the friction material from the points of stabilization of effect and improvement in fade characteristics such as prevention of a decrease in the friction coefficient during fading, and more preferably from 3 to 24% by volume.

Further, lithium potassium titanate in the present invention may be surface treated on its surface with a silane coupling agent or the like from the viewpoint of improving the strength of the friction material.

As the non-whisker-like titanate compounds (hereinafter also described as "titanate compounds") other than non-whisker-like lithium potassium titanate, examples thereof include potassium titanate, lithium titanate, sodium titanate, calcium titanate, magnesium titanate, magnesium potassium titanate, barium titanate and the like. From the point that the amount of the elution of alkali metal ions which may cause degradation of the binder is small, potassium titanate and sodium titanate are more preferred.

As the shapes of the titanate compound, examples thereof include a layer shape, a granular shape, a plate-like shape, a columnar shape and the like, and among these, the granular shape is preferred from the point of wear resistance.

When the titanate compound is in the granular shape, the average particle size of the titanate compound may be from 1 to 50 µm, and above all, it is preferably from 5 to 20 µm from the point of wear resistance.

Figure 1:
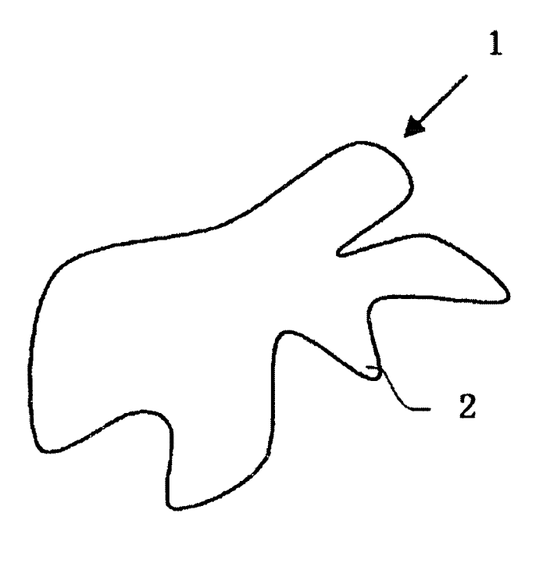
FIG. 1 is a projection view for illustrating a titanate compound having a shape with a plurality of convex portions.

Further, from the point of wear resistance, it is preferred that, as the shape of the titanate compound, the titanate compound has a shape with a plurality of convex portions. "Having a shape with a plurality of convex portions" as used herein means that a projected shape of the titanate compound in the present invention onto a plane can take at least a shape having convex portions in two or more directions, different from an ordinary polygon, a circle, an ellipse and the like. Specifically, this convex portion means a portion corresponding to a portion protruded from a polygon, a circle, an ellipse or the like (a basic figure) fitted to a photograph (projection view) taken by an optical or electron microscope. As the projection view of the titanate compound, for example, one described in FIG. 1 is exemplified, and the convex portion is indicated by the reference numeral 2. As the specific three-dimensional shapes of the titanate compound having the shape with a plurality of convex portions, examples thereof include a boomerang shape, a cross shape, an amoeba shape, parts (for example, hands, horns, leaves and the like) of various animals and plants or the whole or analogous shapes thereof, a Konpeito shape and the like.

Among these, it is more preferred that the titanate compound is in the granular shape having the shape with a plurality of convex portions. As such a titanate compound, examples thereof include potassium titanate described in WO 2008/123046, or the like.

The titanate compound to be used in the present invention has the shape with a plurality of convex portions, so that it is difficult to fall off from the friction material during braking by its convex portions, as compared to the plate-like or scale-like titanate compound. It is therefore considered that the excellent effect of the wear resistance is achieved. Further, the titanate compound having the shape with a plurality of convex portions is difficult to fall off from the friction material, so that lithium potassium titanate in the present invention is also difficult to fall off. As a result, it is presumed that the effect stability and squeal suppressing effect due to lithium potassium titanate is continued.

The content of the non-whisker-like titanate compounds according to the present invention is preferably from 1 to 25% by volume, from the point of decreasing the wear amount of the friction material (pad), and more preferably from 5 to 20% by volume, based on the whole of the friction material.

Further, the non-whisker-like titanate compound in the present invention may be surface treated on its surface with a silane coupling agent or the like, from the viewpoint of improving the strength of the friction material.

In the friction modifier contained in the friction material according to the present invention, other inorganic filler, an organic filler, an abrasive, a solid lubricant and the like may be appropriately mixed, in addition to the above-mentioned lithium potassium titanate and titanate compounds.

As the other inorganic fillers, examples thereof include barium sulfate, calcium carbonate, calcium hydroxide, vermiculite, mica and the like, and powders of metals such as aluminum, tin and zinc. These are used either alone or in combination with two or more thereof.

In the present invention, the other inorganic filler is used preferably in an amount of 1 to 60% by volume, and more preferably in an amount of 1 to 50% by volume, based on the whole of the friction material.

As the organic fillers, examples thereof include various rubber powders (such as rubber dust and tire powder), cashew dust, melamine dust and the like. These are used either alone or in combination with two or more thereof.

In the present invention, the organic filler is used preferably in an amount of 1 to 15% by volume, and more preferably in an amount of 5 to 15% by volume, based on the whole of the friction material.

As the abrasives material, examples thereof include alumina, silica, magnesia, zirconia, zirconium silicate, chromium oxide, triiron tetraoxide ($Fe_3O_4$) and the like. These are used either alone or in combination with two or more thereof.

In the present invention, the abrasive material is used preferably in an amount of 5 to 20% by volume, and more preferably in an amount of 10 to 20% by volume, based on the whole of the friction material.

As the solid lubricants, examples thereof include graphite, molybdenum disulfide, tin sulfide, polytetrafluoroethylene (PTFE) and the like. Further, the particle size of graphite is preferably from 1 to 1000 µm. These are used either alone or in combination with two or more thereof.

In the present invention, the solid lubricant is used preferably in an amount of 1 to 20% by volume, and more preferably in an amount of 3 to 15% by volume, based on the whole of the friction material.

Further, the particle size of the friction modifier is not particularly limited, and can be decided at the discretion of one skilled in the art, depending on characteristics required for the friction material, and the like. However, in order to avoid deterioration of dispersibility during mixing raw materials of the friction material, the average particle size thereof is adjusted preferably to 10 to 1000 µm, and more preferably to about 100 to 500 µm. The average particle size is a value measured with a laser diffraction particle size analyzer.

The friction material according to the present invention contains a binder and a fiber base material, in addition to the friction modifier.

However, the friction material of the present invention contains no copper component. Here, "containing no copper component" as used herein means that the copper component is not contained as an active ingredient for developing functions such as wear resistance, but does not mean, for example, that the copper component as an impurity or the like inevitably slightly contained in the friction material is not contained.

As the binder contained in the friction material according to the present invention, various binders usually employed can be used. Specific examples thereof include thermosetting resins such as straight phenol resins, various phenol resins modified with elastomers or the like, melamine resins, epoxy resins and polyimide resins. Among these, from the viewpoint of imparting flexibility to the friction material to decrease opposite material aggressiveness and to improve squeal characteristics, the elastomer-modified phenol resins are preferred. As the elastomer-modified phenol resins, examples thereof include acrylic rubber-modified phenol resins, silicone rubber-modified phenol resins, NBR rubber-modified phenol resins and the like, and acrylic rubber-modified phenol resins and silicone rubber-modified phenol resins are more preferred. These binders can be used either alone or in combination with two or more thereof.

Further, the binder in the friction material is used preferably in an amount of 10 to 30% by volume, and more preferably in an amount of 10 to 25% by volume, based on the whole of the friction material.

In the fiber base material contained in the friction material according to the present invention, a fiber base material usually employed can be used in an amount usually employed. However, copper fiber containing the copper component is not used.

Specifically, organic fiber, inorganic fiber or metal fiber is used.

As the organic fiber, examples thereof include aromatic polyamide (aramid) fiber or flame-resistant acrylic fiber. As the inorganic fiber, examples thereof include ceramic fiber such as potassium titanate fiber or alumina fiber, bio-soluble inorganic fiber, glass fiber, carbon fiber, rock wool or the like. Further, as the metal fiber, examples thereof include steel fiber. These are used either alone or in combination with two or more thereof. Furthermore, the fiber base material in the friction material is used preferably in an amount of 5 to 40% by volume, and more preferably in an amount of 5 to 25% by volume, based on the whole of the friction material.

Among these, from the viewpoint of a small effect on human body, the bio-soluble inorganic fiber is preferred as the inorganic fiber. Examples of such bio-soluble inorganic fiber include bio-soluble ceramic fiber such as $SiO_2$—$CaO$—$MgO$-based fiber, $SiO_2$—$CaO$—$MgO$—$Al_2O_3$-based fiber or $SiO_2$—$MgO$—$SrO$-based fiber, bio-soluble rock wool and the like.

<Second Friction Material>

A second friction material according to the present invention will be described below.

The friction material according to the present invention contains low-melting-point metal fiber. A low-melting-point metal as used herein means a metal having a melting point of 1000° C. or less. By using the low-melting-point metal, a film can be formed on a counterpart material such as a rotor, because the temperature of a friction material surface during braking is 1000° C. or less. As a result, the friction material having low opposite material aggressiveness and excellent wear resistance can be obtained. Examples of the low-melting-point metals include aluminum, tin, zinc and the like. From the viewpoint of heat resistance, aluminum and zinc are more preferred.

Further, in the present invention, the shear strength of the friction material can be improved by containing such a low-melting-point metal in a fiber state. The reason for this is considered to be that fibers are easily entangled with one another, different from the case of powders, resulting in being able to impart a reinforcing effect to the friction material. From the viewpoint of increasing the reinforcing effect, it is preferred that the fiber has an average fiber length of 1 to 10 mm and an average fiber diameter of 10 to 500 μm.

The content of the low-melting-point metal fiber is preferably from 0.2 to 7.0% by mass, and more preferably from 1.0 to 5.0% by mass, based on the whole of the friction material. The content being within such a range is preferred from the viewpoint of the reinforcing effect.

The friction material according to the present invention further contains a non-whisker-like titanate compound. This makes it possible to obtain the friction material excellent in wear resistance. "Non-whisker-like" as used herein means that it does not have an acicular shape (whisker-like shape) having an aspect ratio of 3 or more and a fiber diameter of 6 μm or less, and specific examples thereof include shapes such as a layer shape (scale-like shape), a columnar shape, a plate-like shape, a flake shape and a granular shape. It is preferred to contain the non-whisker-like titanate compound, from the viewpoint of being able to achieve the excellent effect of wear resistance.

As the non-whisker-like titanate compounds (hereinafter also described as "titanate compounds"), examples thereof include potassium titanate, lithium titanate, lithium potassium titanate, sodium titanate, calcium titanate, magnesium titanate, magnesium potassium titanate, barium titanate and the like. From the point of improving wear resistance, potassium titanate, lithium potassium titanate and magnesium potassium titanate are more preferred. These are used either alone or in combination with two or more thereof.

Non-whisker-like potassium titanate (hereinafter sometimes briefly referred to as "potassium titanate") to be used in the present invention is preferably potassium hexatitanate ($K_2O.6TiO_2$) or potassium octatitanate ($K_2O.8TiO_2$).

As the shapes of potassium titanate, examples thereof include a layer shape, a granular shape, a plate-like shape, a columnar shape and the like, and among these, the granular shape is preferred from the point of wear resistance.

Further, from the point of wear resistance, it is preferred that, as the shape of potassium titanate, the potassium titanate has a shape with a plurality of convex portions. "Having a shape with a plurality of convex portions" as used herein means that a projected shape of potassium titanate onto a plane can take at least a shape having convex portions in two or more directions, different from an ordinary polygon, a circle, an ellipse and the like. Specifically, this convex portion means a portion corresponding to a portion protruded from a polygon, a circle, an ellipse or the like (a basic figure) fitted to a photograph (projection view) taken by an optical or electron microscope. As the specific three-dimensional shapes of potassium titanate having the shape with a plurality of convex portions, examples thereof include a boomerang shape, a cross shape, an amoeba shape, parts (for example, hands, horns, leaves and the like) of various animals and plants or the whole or analogous shapes thereof, a Konpeito shape and the like.

Among these, it is more preferred that potassium titanate is in the granular shape having the shape with a plurality of convex portions. As such potassium titanate, examples thereof include potassium titanate described in WO 2008/123046, or the like.

As the shape of non-whisker-like lithium potassium titanate (hereinafter sometimes briefly referred to as "lithium potassium titanate") to be used in the present invention, the shape such as the layer shape, the columnar shape or the plate-like shape is preferred. From the point of effect stabilization, the layer shape is preferred.

Further, as the molecular formula of lithium potassium titanate, usable examples thereof include $K_xLi_yTi_zO_w$ (wherein x=0.5 to 0.7, y=0.27, z=1.73 and w=3.85 to 3.95) or the like.

As the shape of the non-whisker-like magnesium potassium titanate (hereinafter sometimes briefly referred to as "magnesium potassium titanate") to be used in the present invention, the shape such as the layer shape, the columnar shape or the plate-like shape is preferred. From the point of effect stabilization, the layer shape is preferred.

Further, as the molecular formula of magnesium potassium titanate, usable examples thereof include $K_{x1}Mg_{y1}Ti_{z1}O_{w1}$ (wherein x1=0.2 to 0.7, y1=0.4, z1=1.6 and w1=3.7 to 3.95) or the like.

The average particle size of the non-whisker-like titanate compound may be from 1 to 100 μm, and above all, it is preferably from 1 to 20 μm, from the point of wear resistance. The average article size is a value measured with a laser diffraction particle size analyzer.

Further, the non-whisker-like titanate compound may be surface treated on its surface with a silane coupling agent or the like from the viewpoint of improving the strength of the friction material.

In the present invention, the total content of the non-whisker-like titanate compound is preferably within the range of 1 to 40% by mass, from the point of decreasing the wear amount of the friction material (pad), and more preferably from 5 to 35% by mass, based on the whole of the friction material.

The friction material according to the present invention contains a fiber base material, a friction modifier and a binder, in addition to the above-mentioned components.

However, the friction material in the present invention contains no copper component. Here, "containing no copper component" as used herein means that the copper component is not contained as an active ingredient for developing functions such as wear resistance, but does not mean, for example, that the copper component as an impurity or the like inevitably slightly contained in the friction material is not contained.

In the fiber base material contained in the friction material according to the present invention, a fiber base material usually employed can be used in an amount usually employed, and specific examples thereof include organic fiber, inorganic fiber or metal fiber. However, copper fiber or bronze fiber, containing the copper component, is not used.

As the organic fiber, examples thereof include aromatic polyamide (aramid) fiber or flame-resistant acrylic fiber. As the inorganic fiber, examples thereof include ceramic fiber such as potassium titanate fiber or alumina fiber, bio-soluble inorganic fiber, glass fiber, carbon fiber, rock wool or the like. Further, as the metal fiber, examples thereof include steel fiber. These are used either alone or in combination with two or more thereof. Furthermore, the fiber base material in the friction material is used preferably in an amount of 1 to 40% by mass, and more preferably in an amount of 5 to 25% by mass, based on the whole of the friction material. In such a content, the content of the above-mentioned low-melting-point metal fiber is not contained.

Among these, from the viewpoint of a small effect on human body, the bio-soluble inorganic fiber is preferred as the inorganic fiber. Examples of such bio-soluble inorganic fiber include bio-soluble ceramic fiber such as $SiO_2$—$CaO$—$MgO$-based fiber, $SiO_2$—$CaO$—$MgO$—$Al_2O_3$-based fiber or $SiO_2$—$MgO$—$SrO$-based fiber, bio-soluble rock wool and the like.

It is preferred that the bio-soluble inorganic fiber has an average fiber diameter of 0.1 to 20 μm and an average fiber length of 100 to 5000 mm.

Further, the bio-soluble inorganic fiber may be surface treated on its surface with a silane coupling agent or the like from the viewpoint of improving the strength of the friction material.

In the friction modifier contained in the friction material of the present invention, an inorganic filler, an organic filler, an abrasive, a solid lubricant and the like may be appropriately mixed.

As the inorganic fillers, examples thereof include inorganic materials such as barium sulfate, calcium carbonate, calcium hydroxide, vermiculite and mica, and powders of metals such as aluminum, tin and zinc, in addition to the above-mentioned non-whisker-like titanate compound. These are used either alone or in combination with two or more thereof.

In the present invention, the inorganic filler is used preferably in an amount of 1 to 60% by mass, and more preferably in an amount of 1 to 50% by mass, based on the whole of the friction material.

As the organic fillers, examples thereof include various rubber powders (such as raw rubber dust and tire powder), cashew dust, melamine dust and the like. These are used either alone or in combination with two or more thereof.

In the present invention, the organic filler is used preferably in an amount of 1 to 15% by mass, and more preferably in an amount of 1 to 10% by mass, based on the whole of the friction material.

As the abrasives, examples thereof include alumina, silica, magnesia, zirconia, zirconium silicate, chromium oxide, triiron tetraoxide ($Fe_3O_4$), chromite and the like. These are used either alone or in combination with two or more thereof.

In the present invention, the abrasive material is used preferably in an amount of 5 to 30% by mass, and more preferably in an amount of 10 to 30% by mass, based on the whole of the friction material.

As the solid lubricant, examples thereof include graphite, antimony trisulfide, molybdenum disulfide, tin sulfide, polytetrafluoroethylene (PTFE) and the like. Further, the particle size of graphite is preferably from 1 to 1000 μm. These are used either alone or in combination with two or more thereof.

In the present invention, the solid lubricant is used preferably in an amount of 1 to 20% by mass, and more preferably in an amount of 3 to 15% by mass, based on the whole of the friction material.

As the binder contained in the friction material according to the present invention, various binders usually employed can be used. Specific examples thereof include thermosetting resins such as straight phenol resins, various phenol resins modified with elastomers or the like, melamine resins, epoxy resins and polyimide resins. As the elastomer-modified phenol resins, examples thereof include acrylic rubber-modified phenol resins, silicone rubber-modified phenol resins, NBR rubber-modified phenol resins and the like. These binders can be used either alone or in combination with two or more thereof.

Further, the binder in the friction material is used preferably in an amount of 5 to 20% by mass, and more preferably in an amount of 5 to 15% by mass, based on the whole of the friction material.

<Production Method>

As specific aspects of a production method of the first friction material and the second friction material according to the present invention, common production process can be performed.

For example, the friction material can be prepared by blending the above-mentioned respective components, and subjecting the blended composition to steps such as preforming, thermoforming, heating and grinding, according to ordinary manufacturing methods.

General steps in the production of a brake pad including the friction material are shown below:

(a) a step of forming a pressure plate into a predetermined shape with a sheet-metal press, (b) a step of subjecting the above-mentioned pressure plate to degreasing treatment, chemical conversion treatment and primer treatment, (c) a step of subjecting raw materials obtained by blending powder raw materials such as the fiber base material, the friction modifier and the binder and performing sufficient homogenization by mixing, to the formation at ordinary temperature and a predetermined pressure, thereby preparing a preformed body, (d) a thermoforming step of integrally firmly bonding both members, the above-mentioned preformed body and the pressure plate coated with an adhesive, by applying a predetermined temperature and pressure, and (e) a step of performing aftercuring and finally performing finishing treatment such as grinding, surface scorching and painting.

EXAMPLES

The present invention is specifically described below with reference to examples. However, the present invention should not be construed as being limited by these examples in any way.

Examples 1-1 to 1-10 and Comparative Examples 1-1 to 1-4

(Raw Materials)

Lithium potassium titanate (non-whisker-like lithium potassium titanate): TERRACESS L-SS (manufactured by Otsuka Chemical Co., Ltd.)

Potassium titanate (potassium titanate having a shape with a plurality of convex portions): TERRACESS JP (manufactured by Otsuka Chemical Co., Ltd.)

Bio-soluble inorganic fiber: Biostar 600/70 (manufactured by ITM Co., Ltd.)

Graphite: G-152A (Tokai Carbon Co., Ltd., average particle size: 700 μm)

(Preparation of Friction Materials)

Preformed bodies were each prepared by mixing a fiber base material, a friction modifier and a binder at a compounding ratio shown in Table 1 using a mixer, and thereafter putting the resulting mixture into a preforming die, followed by pressurization at 20 MPa for 10 seconds at ordinary temperature. Then, the preformed bodies were each put into a thermoforming die, and overlaid with a metal plate (pressure plate) on which an adhesive had been previously coated, followed by subjecting to heat pressure forming at 150° C. and 40 MPa for 5 minutes. The resulting heat pressure-formed bodies were heat treated at 220° C. for 3 hours, followed by subjecting to grinding to a predetermined thickness (the thickness of a friction material: 11 mm, the thickness of the pressure plate: 6 mm), surface scorching and painting, thereby obtaining friction materials 1-A to 1-N.

(Friction Tests)

For the friction materials A to N obtained by the above-mentioned method, friction tests were performed using a dynamo tester in accordance with JASO-C406. The results of the second effect friction coefficient, the first fade minimum friction coefficient, the pad wear amount and the rotor wear amount are shown in Table 1.

Second Effect Friction Coefficient

The second effect friction coefficient was determined by measuring a value at 50 km/h and 2.94 m/s$^2$. It was judged as effective when it fell within the numerical range of ±5% (from 0.43 to 0.47) on the basis of the friction coefficient (0.45).

First Fade Minimum Friction Coefficient

The first fade minimum friction coefficient was judged as effective when it was a value of 0.26 or more.

Pad Wear Amount

For wear resistance, effectiveness thereof was judged on the basis of the pad wear amount in Comparative Example 1 containing copper fiber. The case of −10% or less thereof was judged as A, the case of −10% to 0% thereof was judged as B, the case of 0 to 10% thereof was judged as C, and the case of 10% or more thereof was judged as D.

Rotor Wear Amount

For opposite material aggressiveness, effectiveness thereof was judged on the basis of the rotor wear amount in Comparative Example 1 containing copper fiber. The case of −10% or less thereof was judged as A, the case of −10% to 0% thereof was judged as B, the case of 0 to 10% thereof was judged as C, and the case of 10% or more thereof was judged as D.

(Squeal Evaluation)

For the friction materials A to N obtained by the above-mentioned method, a friction test was performed at respective temperatures in accordance with the JASO-C427 test method. The results thereof are shown in Table 1.

When sounds having a sound pressure of 60 dB or more at a frequency of 2 kHz or more occurred in 10% or less of the number of braking, effectiveness thereof was judged as A. The case where the sounds occurred in 10% to 25% was judged as B, the case where occurred in 25% to 50% was judged as C, and the case where occurred in 50% or more was judged as D.

TABLE 1

| | | | | Ex. 1-1 1-A | Ex. 1-2 1-B | Ex. 1-3 1-C | Ex. 1-4 1-D | Ex. 1-5 1-E | Ex. 1-6 1-F | Ex. 1-7 1-G |
|---|---|---|---|---|---|---|---|---|---|---|
| Blending composition | Binder (% by volume) | | Straight phenol resin | 20 | 20 | 20 | 20 | 20 | — | — |
| | | | Acrylic rubber-modified phenol resin | — | — | — | — | — | 20 | — |
| | | | Silicone rubber-modified phenol resin | — | — | — | — | — | — | 20 |
| | Friction modifier | Filler (% by volume) | Cashew dust | 7 | 7 | 7 | 7 | 7 | 7 | 7 |
| | | | Barium sulfate | 40 | 23 | 2 | 24 | 27 | 23 | 23 |
| | | | Mica | 2 | 2 | 2 | 2 | 2 | 2 | 2 |
| | | | Lithium potassium titanate | 3 | 12 | 24 | 10 | 5 | 12 | 12 |
| | | | Potassium titanate (*) | 1 | 9 | 18 | 10 | 12 | 9 | 9 |
| | | Abrasive (% by volume) | Zirconium silicate | 7 | 7 | 7 | 7 | 7 | 7 | 7 |
| | | | Triiron tetraoxide (Fe$_3$O$_4$) | 4 | 4 | 4 | 4 | 4 | 4 | 4 |
| | | Solid lubricant (% by volume) | Graphite | 9 | 9 | 9 | 9 | 9 | 9 | 9 |
| | | Metal (% by volume) | Copper fiber | — | — | — | — | — | — | — |
| | Fiber base material (% by volume) | | Aramid fiber | 5 | 5 | 5 | 5 | 5 | 5 | 5 |
| | | | Bio-soluble inorganic fiber | 2 | 2 | 2 | 2 | 2 | 2 | 2 |
| Evaluation | Friction performance | | Second effect friction coefficient (50 km/h, 2.94 m/s$^2$) | 0.47 | 0.46 | 0.43 | 0.46 | 0.47 | 0.44 | 0.45 |
| | | | First fade minimum friction coefficient | 0.26 | 0.27 | 0.27 | 0.26 | 0.26 | 0.26 | 0.26 |
| | Wear resistance | | Pad wear amount (mm) | B | A | A | B | A | A | B |
| | | | Rotor wear amount (μm) | B | B | B | B | B | A | B |

TABLE 1-continued

| | | | | | | B | B | A | B | B | A | A |
|---|---|---|---|---|---|---|---|---|---|---|---|---|
| | Brake squeal | | Squeal occurrence rate (50 km/h, 2.94 m/s$^2$) | | | | | | | | | |

| | | | | Ex. 1-8 1-H | Ex. 1-9 1-I | Ex. 1-10 1-J | Comp. Ex. 1-1 1-K | Comp. Ex. 1-2 1-L | Comp. Ex. 1-3 1-M | Comp. Ex. 1-4 1-N |
|---|---|---|---|---|---|---|---|---|---|---|
| Blending composition | Binder (% by volume) | | Straight phenol resin | — | — | 10 | 20 | 20 | 20 | 20 |
| | | | Acrylic rubber-modified phenol resin | 20 | 20 | 10 | — | — | — | — |
| | | | Silicone rubber-modified phenol resin | — | — | — | — | — | — | — |
| | Friction modifier | Filler (% by volume) | Cashew dust | 7 | 7 | 7 | 7 | 7 | 7 | 7 |
| | | | Barium sulfate | 40 | 2 | 23 | 30 | 35 | 32 | 44 |
| | | | Mica | 2 | 2 | 2 | 2 | 2 | 2 | 2 |
| | | | Lithium potassium titanate | 3 | 24 | 12 | — | — | 12 | — |
| | | | Potassium titanate (*) | 1 | 18 | 9 | 9 | 9 | — | — |
| | | Abrasive material (% by volume) | Zirconium silicate | 7 | 7 | 7 | 7 | 7 | 7 | 7 |
| | | | Triiron tetraoxide (Fe$_3$O$_4$) | 4 | 4 | 4 | 4 | 4 | 4 | 4 |
| | | Solid lubricant (% by volume) | Graphite | 9 | 9 | 9 | 9 | 9 | 9 | 9 |
| | | Metal (% by volume) | Copper fiber | — | — | — | 5 | — | — | — |
| | | Fiber base material (% by volume) | Aramid fiber | 5 | 5 | 5 | 5 | 5 | 5 | 5 |
| | | | Bio-soluble inorganic fiber | 2 | 2 | 2 | 2 | 2 | 2 | 2 |
| Evaluation | Friction performance | | Second effect friction coefficient (50 km/h, 2.94 m/s$^2$) | 0.47 | 0.43 | 0.45 | 0.45 | 0.53 | 0.46 | 0.52 |
| | | | First fade minimum friction coefficient | 0.26 | 0.27 | 0.26 | 0.26 | 0.21 | 0.25 | 0.20 |
| | Wear resistance | | Pad wear amount (mm) | B | A | B | B | B | D | D |
| | | | Rotor wear amount (μm) | A | B | B | B | D | D | D |
| | Brake squeal | | Squeal occurrence rate (50 km/h, 2.94 m/s$^2$) | A | A | A | B | D | B | D |

(*) Potassium titanate having a shape with a plurality of convex portions

From Table 1, it has been found that when layer-shaped lithium potassium titanate and granular potassium titanate having a plurality of convex portions were used as the inorganic fillers in combination at a blending composition within a proper range, even if the friction materials contain no copper component, friction performance, wear resistance and squeal characteristics equivalent to or more than those of the conventional copper-blended friction material (Comparative Example 1-1) could be achieved. Further, use of the elastomer-modified phenol resin as the binder has resulted in more improvement of the effect stability and brake squeal.

Examples 2-1 to 2-15 and Comparative Examples 2-1 to 2-3

(Raw Materials)

Potassium titanate 1 (potassium titanate having a shape with a plurality of convex portions): TERRACESS JP (manufactured by Otsuka Chemical Co., Ltd.)

Potassium titanate 2 (plate-like potassium titanate): TERRACESS TF-S (manufactured by Otsuka Chemical Co., Ltd.)

Lithium potassium titanate (non-whisker-like lithium potassium titanate): TERRACESS L-SS (manufactured by Otsuka Chemical Co., Ltd.)

Magnesium potassium titanate (non-whisker-like magnesium potassium titanate): TERRACESS P-S (manufactured by Otsuka Chemical Co., Ltd.)

Bio-soluble inorganic fiber: Biostar 600/70 (manufactured by ITM Co., Ltd.)

(Preparation of Friction Materials)

Preformed bodies were each prepared by mixing a fiber base material, a friction modifier and a binder at a compounding ratio shown in Table 2 using a mixer, and thereafter putting the resulting mixture into a preforming die, followed by pressurization at 20 MPa for 10 seconds at ordinary temperature. Then, the preformed bodies were each put into a thermoforming die, and overlaid with a metal plate (pressure plate) on which an adhesive had been previously coated, followed by subjecting to heat pressure forming at 150° C. and 40 MPa for 5 minutes. The resulting heat pressure-formed bodies were heat treated at 220° C. for 3 hours, followed by subjecting to grinding to a predetermined thickness (the thickness of a friction material: 11 mm, the thickness of the pressure plate: 6 mm), surface scorching and painting, thereby obtaining friction materials 2-A to 2-R.

(Friction Test)

For the friction materials obtained by the above-mentioned method, the wear amount of the friction material corresponding to 1000 cycles of braking at a brake temperature of 100° C. was evaluated using a dynamo tester in accordance with JASO-C427. The results thereof are shown in Table 2.

As for the evaluation criteria, the wear amount of less than 0.1 mm was evaluated as A, the wear amount of 0.1 to 0.2 mm was evaluated as B, and the wear amount of more than 0.2 mm was evaluated as C.

(Shear Strength)

According to JIS D4422, the shear strength of the friction material was measured (adhesion area: 50 cm$^2$).

The measured stress at the time when shear fracture occurred was divided by the area of the friction material to calculate the shear force per unit area (N/cm$^2$). The results thereof are shown in Table 2.

As for the evaluation criteria, the case of exceeding 580 N/cm$^2$ was evaluated as A, the case of 530 to 580 N/cm$^2$ was evaluated as B, and the case of 400 N/cm$^2$ or more and less than 530 N/cm$^2$ was evaluated as C.

TABLE 2

| | | | Ex. 2-1 2-A | Ex. 2-2 2-B | Ex. 2-3 2-C | Ex. 2-4 2-D | Ex. 2-5 2-E | Ex. 2-6 2-F | Ex. 2-7 2-G | Ex. 2-8 2-H | Ex. 2-9 2-I |
|---|---|---|---|---|---|---|---|---|---|---|---|
| Blending composition | Binder (% by mass) | Straight phenol resin | 10 | 10 | 10 | 10 | 10 | 10 | 10 | 10 | 10 |
| | Friction modifier (% by mass) | Filler Cashew dust | 7 | 7 | 7 | 7 | 7 | 7 | 7 | 7 | 7 |
| | | Barium sulfate | 23.8 | 23.5 | 23 | 19 | 23.8 | 23.5 | 23 | 19 | 29 |
| | | Mica | 2 | 2 | 2 | 2 | 2 | 2 | 2 | 2 | 2 |
| | | Potassium titanate 1 | 10 | 10 | 10 | 10 | 10 | 10 | 10 | 10 | 10 |
| | | Potassium titanate 2 | — | — | — | — | — | — | — | — | — |
| | | Lithium potassium titanate | 10 | 10 | 10 | 10 | 10 | 10 | 10 | 10 | — |
| | | Magnesium potassium titanate | — | — | — | — | — | — | — | — | — |
| | Abrasive material (% by mass) | Zirconium silicate | 10 | 10 | 10 | 10 | 10 | 10 | 10 | 10 | 10 |
| | | Triiron tetraoxide ($Fe_3O_4$) | 10 | 10 | 10 | 10 | 10 | 10 | 10 | 10 | 10 |
| | Solid lubricant (% by mass) | Graphite | 9 | 9 | 9 | 9 | 9 | 9 | 9 | 9 | 9 |
| | Fiber base material (% by mass) | Aramid fiber | 5 | 5 | 5 | 5 | 5 | 5 | 5 | 5 | 5 |
| | | Bio-soluble inorganic fiber | 3 | 3 | 3 | 3 | 3 | 3 | 3 | 3 | 3 |
| | | Aluminum fiber | 0.2 | 0.5 | 1 | 5 | — | — | — | — | 5 |
| | | Zinc fiber | — | — | — | — | 0.2 | 0.5 | 1 | 5 | — |
| | | Copper fiber | — | — | — | — | — | — | — | — | — |
| | Total | | 100 | 100 | 100 | 100 | 100 | 100 | 100 | 100 | 100 |
| Evaluation | Wear resistance | 100° C. pad wear amount (mm) | 0.11 | 0.06 | 0.09 | 0.13 | 0.11 | 0.07 | 0.08 | 0.12 | 0.12 |
| | | Wear resistance judgment | B | A | A | B | B | A | A | B | B |
| | Shear strength | Ordinary temperature shear strength ($N/cm^2$) | 510 | 560 | 600 | 655 | 520 | 570 | 610 | 690 | 650 |
| | | Shear strength judgment | C | B | A | A | C | B | A | A | A |

| | | | Ex. 2-10 2-J | Ex. 2-11 2-K | Ex. 2-12 2-L | Ex. 2-13 2-M | Ex. 2-14 2-N | Ex. 2-15 2-O | Comp. Ex. 2-1 2-P | Comp. Ex. 2-2 2-Q | Comp. Ex. 2-3 2-R |
|---|---|---|---|---|---|---|---|---|---|---|---|
| Blending composition | Binder (% by mass) | Straight phenol resin | 10 | 10 | 10 | 10 | 10 | 10 | 10 | 10 | 10 |
| | Friction modifier (% by mass) | Filler Cashew dust | 7 | 7 | 7 | 7 | 7 | 7 | 7 | 7 | 7 |
| | | Barium sulfate | 29 | 29 | 29 | 34 | 14 | 4 | 19 | 44 | 39 |
| | | Mica | 2 | 2 | 2 | 2 | 2 | 2 | 2 | 2 | 2 |
| | | Potassium titanate 1 | — | — | — | 5 | 25 | 35 | 20 | — | — |
| | | Potassium titanate 2 | 10 | — | — | — | — | — | — | — | — |
| | | Lithium potassium titanate | — | 10 | — | — | — | — | — | — | — |
| | | Magnesium potassium titanate | — | — | 10 | — | — | — | — | — | — |
| | Abrasive material (% by mass) | Zirconium silicate | 10 | 10 | 10 | 10 | 10 | 10 | 10 | 10 | 10 |
| | | Triiron tetraoxide ($Fe_3O_4$) | 10 | 10 | 10 | 10 | 10 | 10 | 10 | 10 | 10 |
| | Solid lubricant (% by mass) | Graphite | 9 | 9 | 9 | 9 | 9 | 9 | 9 | 9 | 9 |
| | Fiber base material (% by mass) | Aramid fiber | 5 | 5 | 5 | 5 | 5 | 5 | 5 | 5 | 5 |
| | | Bio-soluble inorganic fiber | 3 | 3 | 3 | 3 | 3 | 3 | 3 | 3 | 3 |
| | | Aluminum fiber | 5 | 5 | 5 | 5 | 5 | 5 | — | — | 5 |
| | | Zinc fiber | — | — | — | — | — | — | — | — | — |
| | | Copper fiber | — | — | — | — | — | — | 5 | — | — |
| | Total | | 100 | 100 | 100 | 100 | 100 | 100 | 100 | 100 | 100 |
| Evaluation | Wear resistance | 100° C. pad wear amount (mm) | 0.14 | 0.13 | 0.13 | 0.14 | 0.12 | 0.16 | 0.11 | 0.24 | 0.22 |
| | | Wear resistance judgment | B | B | B | B | B | B | B | C | C |
| | Shear strength | Ordinary temperature shear strength ($N/cm^2$) | 630 | 640 | 630 | 635 | 660 | 650 | 645 | 430 | 590 |
| | | Shear strength judgment | A | A | A | A | A | A | A | C | A |

It has been found that the friction materials 2-A to 2-O of Examples 2-1 to 2-15 contained the non-whisker-like titanate compound and the aluminum fiber or the zinc fiber as the low-melting-point metal fiber, and were improved in shear strength, as compared to the friction material 2-Q (Comparative Example 2-2) containing no low-melting-point metal fiber. Further, although these contained no copper fiber, these have showed the shear strength equivalent to that of the friction material 2-P (Comparative Example 2-1), by containing the same amount of low-melting-point metal fiber as the friction material 2-P containing the conventional copper fiber. On the other hand, it has been found that the friction materials 2-A to 2-O are excellent in wear resistance, as compared to the friction material 2-Q (Comparative Example 2-2) and friction material 2-R (Comparative Example 2-3) containing no non-whisker-like titanate compound. According to the present invention, therefore, the friction material having excellent wear resistance and shear strength can be obtained by containing the non-whisker-like titanate compound and the low-melting-point metal fiber.

While the present invention has been described in detail and with reference to specific embodiments thereof, it will be apparent to those skilled in the art that various changes and modifications can be made therein without departing from the spirit and scope of the present invention. This application is based on Japanese Patent Application No. 2012-280238 filed on Dec. 21, 2012 and Japanese Patent Application No. 2013-040022 filed on Feb. 28, 2013, the contents of which are incorporated herein by reference.

INDUSTRIAL APPLICABILITY

The present invention provides a friction material having excellent effect stability, wear resistance and squeal characteristics without using a copper component having a possibility of polluting the environment.

The present invention further provides a friction material having excellent wear resistance and shear strength without using a copper component.

The friction material according to the present invention can be suitably used for disc pads, brake linings, clutch facings and the like of automobiles, railway vehicles, various industrial machines and the like without putting a load on the environment.

DESCRIPTION OF REFERENCE NUMERALS AND SIGNS

1: Titanate compound having a shape with a plurality of convex portions
2: Convex portion

The invention claimed is:

1. A friction material comprising:
a fiber base material;
a friction modifier; and
a binder,
wherein the friction modifier comprises two or more kinds of non-whisker-like titanate compounds, the non-whisker-like titanate compound comprises at least non-whisker-like lithium potassium titanate and potassium titanate having a shape with a plurality of convex portions, the non-whisker-like lithium potassium titanate is in an amount of 1 to 30% by volume of the friction material, and the friction material comprises no copper component,
wherein the binder comprises at least one selected from the group consisting of a straight phenol resin, an acrylic rubber-modified phenol resin, and a silicone rubber-modified phenol resin,
wherein the friction modifier further comprises at least one selected from the group consisting of an organic filler, an inorganic filler other than the non-whisker-like titanate compound, an abrasive, and a solid lubricant, and the organic filler comprises a cashew dust, the inorganic filler other than the non-whisker-like titanate compound comprises at least one of barium sulfate and mica, the abrasive comprises at least one of zirconium silicate and triiron tetraoxide, and the solid lubricant comprises graphite,
wherein the fiber base material comprises at least one of an aramid fiber and a bio-soluble inorganic fiber, and
wherein the organic filler is contained in an amount of 5 to 15% by volume, the inorganic filler other than the non-whisker-like titanate compound is contained in an amount of 1 to 50% by volume, the abrasive is contained in an amount of 5 to 20% by volume, and the solid lubricant is contained in an amount of 3 to 15% by volume.

2. The friction material according to claim 1, comprising the potassium titanate having a shape with a plurality of convex portions in an amount of 1 to 25% by volume.

3. The friction material according to claim 1, wherein the non-whisker-like lithium potassium titanate is in an amount of 3 to 24% by volume of the friction material, and
wherein the potassium titanate having the shape with the plurality of convex portions in an amount of 1 to 18% by volume.

4. The friction material according to claim 1, wherein the fiber base material comprises the bio-soluble inorganic fiber.

* * * * *